United States Patent
Yu

(10) Patent No.: US 12,332,686 B2
(45) Date of Patent: Jun. 17, 2025

(54) HOUSING STRUCTURE OF PORTABLE ELECTRONIC DEVICE

(71) Applicant: Acer Incorporated, New Taipei (TW)

(72) Inventor: Jui-Yi Yu, New Taipei (TW)

(73) Assignee: Acer Incorporated, New Taipei (TW)

( * ) Notice: Subject to any disclaimer, the term of this patent is extended or adjusted under 35 U.S.C. 154(b) by 167 days.

(21) Appl. No.: 18/310,548

(22) Filed: May 2, 2023

(65) Prior Publication Data
US 2023/0418327 A1     Dec. 28, 2023

(30) Foreign Application Priority Data

Jun. 28, 2022 (TW) .................................. 111124058

(51) Int. Cl.
*G06F 1/16* (2006.01)
(52) U.S. Cl.
CPC .................................. *G06F 1/1615* (2013.01)
(58) Field of Classification Search
CPC ..... B25B 23/12; G06F 1/1633; G06F 1/1656; G06F 1/1675; G06F 1/1679
See application file for complete search history.

(56) References Cited

U.S. PATENT DOCUMENTS

| | | | | |
|---|---|---|---|---|
| 5,794,497 A * | 8/1998 | Anderson | ............. | B25B 11/002 81/125 |
| 9,086,852 B2 * | 7/2015 | Johnson | ................ | G06F 1/1662 |
| 10,285,288 B1 * | 5/2019 | Su | ............... | H05K 5/03 |
| 10,389,297 B1 * | 8/2019 | Elisary | .................... | H01R 4/305 |
| 2007/0007775 A1 * | 1/2007 | Gallas | ...................... | E05C 19/16 292/251.5 |
| 2007/0234857 A1 * | 10/2007 | Kozak | ...................... | B25B 15/02 81/451 |
| 2008/0007902 A1 * | 1/2008 | Kim | ....................... | G06F 1/1656 361/679.08 |
| 2012/0131967 A1 * | 5/2012 | Sanchez | ............... | E05B 47/0038 70/276 |
| 2015/0055279 A1 | 2/2015 | McBroom et al. | | |

FOREIGN PATENT DOCUMENTS

| | | |
|---|---|---|
| CN | 210348889 | 4/2020 |
| WO | 2020096583 | 5/2020 |

\* cited by examiner

*Primary Examiner* — Adrian S Wilson
(74) *Attorney, Agent, or Firm* — JCIPRNET

(57) ABSTRACT

A housing structure of portable electronic device including a first housing, a plurality of holders, a second housing, a plurality screw columns, and a plurality screws is provided. The holders are disposed on a first surface of the first housing respectively, and a receiving space is formed by each of the holders and the first housing. The screw columns are disposed on a second surface of the second housing to correspond to the receiving spaces respectively. Each of the screws disposed in the receiving space protrudes out of the receiving member partially to be screwed to the corresponding screw column so as to assemble the first housing and the second housing together to form an assembling body. The first and the second surfaces are inner surfaces of the assembling body.

7 Claims, 6 Drawing Sheets

HOUSING STRUCTURE OF PORTABLE ELECTRONIC DEVICE

CROSS-REFERENCE TO RELATED APPLICATION

This application claims the priority benefit of Taiwan application serial no. 111124058, filed on Jun. 28, 2022. The entirety of the above-mentioned patent application is hereby incorporated by reference herein and made a part of this specification.

BACKGROUND

Technical Field

The disclosure relates to a housing structure, and in particular, to a housing structure of portable electronic device.

Description of Related Art

In general, for a portable electronic device, such as a notebook computer or a tablet computer, the housing of the portable electronic device usually uses a hook structure as a common medium for mutual combination. That is to say, the housings can maintain the mutual locking state from multiple dimensions by using these hook structures.

However, in recent years, with the trend toward thin and light portable electronic devices, and the design of narrow bezels applied to display screens, the existing hook structures cannot be used. The reason is that, in order to maintain the multi-dimensional buckled state of the housing, it is necessary to have enough space for arranging and arranging these hook structures.

Although the above-mentioned purpose can be achieved by reducing the size of these hook structures, problems such as weakening of the housing are derived therefrom. Therefore, how to provide a housing structure that can meet the above requirements is a problem to be solved by those skilled in the art.

SUMMARY

The application provides a housing structure of portable electronic device, which simplifies the disassembly and assembly process of the housing and provides a concise appearance through a hidden locking mechanism.

A housing structure of portable electronic device including a first housing, a plurality of holders, a second housing, a plurality screw columns, and a plurality screws is provided. The holders are disposed on a first surface of the first housing respectively, and a receiving space is formed by each of the holders and the first housing. The screw columns are disposed on a second surface of the second housing to correspond to the receiving spaces respectively. Each of the screws disposed in the receiving space protrudes out of the receiving member partially to be screwed to the corresponding screw column so as to assemble the first housing and the second housing together to form an assembling body. The first and the second surfaces are inner surfaces of the assembling body.

Based on the above, due to the screw columns are arranged on the second surface of the second housing, and the screws and the holders are arranged on the first surface of the first housing. After the first housing and the second housing are assembled by corresponding screws and screw columns to form the assembling body, the first surface and the second surface are the inner surfaces of the assembling body. Accordingly, the above-mentioned locking mechanism substantially forms a hidden locking mechanism of the housing structure of the portable electronic device. In this way, in addition to simplifying the locking mechanism and the locking process, the exterior surface of the housing structure can maintain a simple appearance.

DESCRIPTION OF THE EMBODIMENTS

Figure 1:
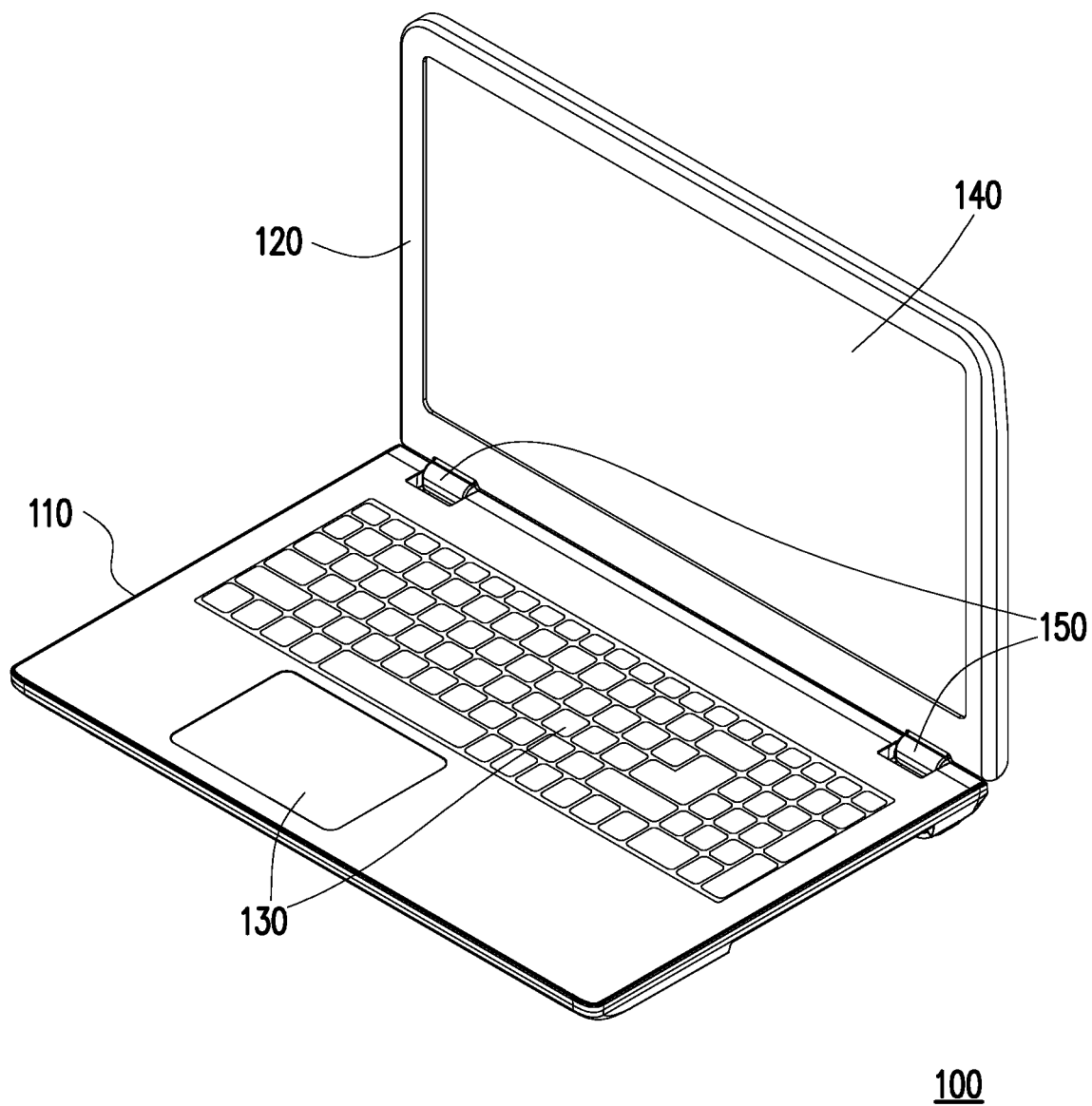
FIG. 1 is a portable electronic device according to an embodiment of the present invention.
Figure 2A:
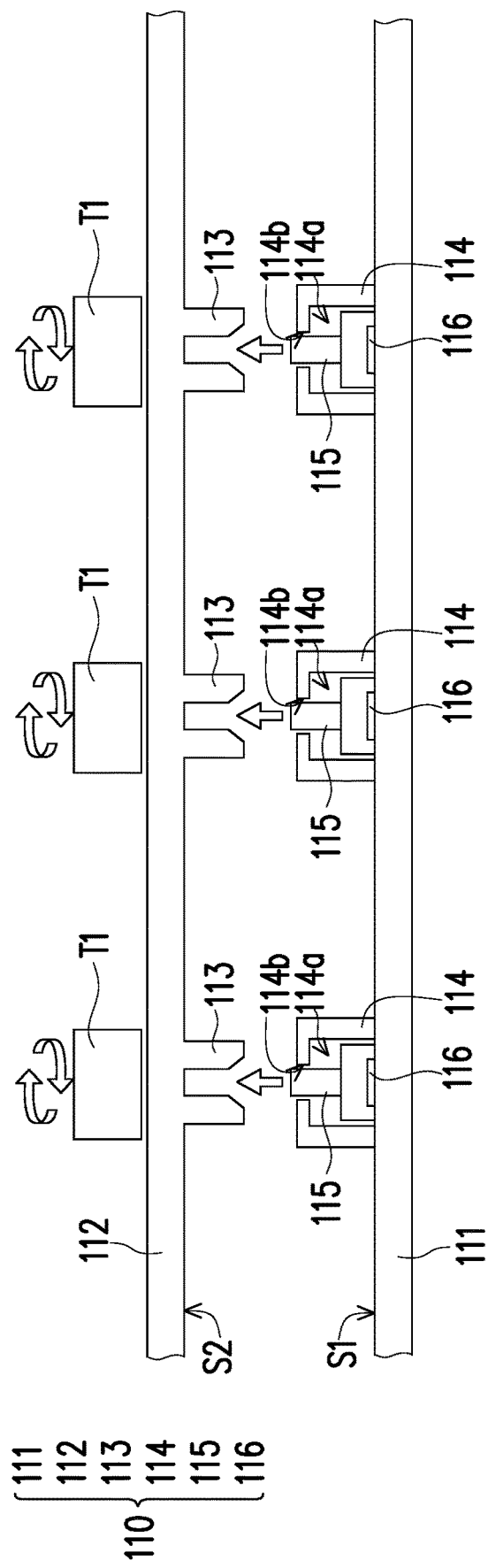
FIG. 2A and FIG. 2B are partial cross-sectional views of the foldable electronic device of FIG. 1.
Figure 2B:
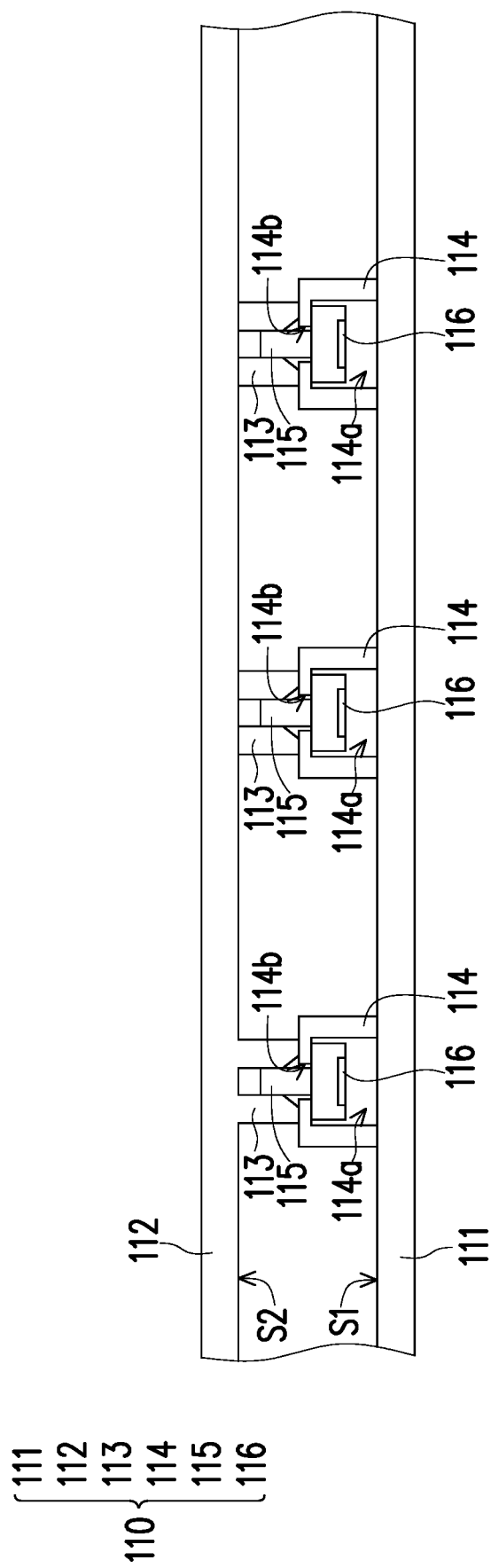

FIG. 1 is a portable electronic device according to an embodiment of the present invention. FIG. 2A and FIG. 2B are partial cross-sectional views of the foldable electronic device of FIG. 1. Referring to FIG. 1 and FIG. 2, in the embodiment, the foldable electronic device 100, taking a notebook computer as an example, includes a first body 110, a second body 120, an input module 130, a display module 140 and a hinge module 150, wherein the first body 110 and the second body 120 are connected together by the hinge module 150 and are opened and closed by relative rotation. The input module 130 is arranged on the first body 110, and the display module 140 is arranged on the second body 120.

Here, the housing structure of the foldable electronic device 100 is the first body 110 or the second body 120. The embodiment takes the first body 110 as an example, and the second body 120 can adopt the same or similar structure.

Figure 2C:
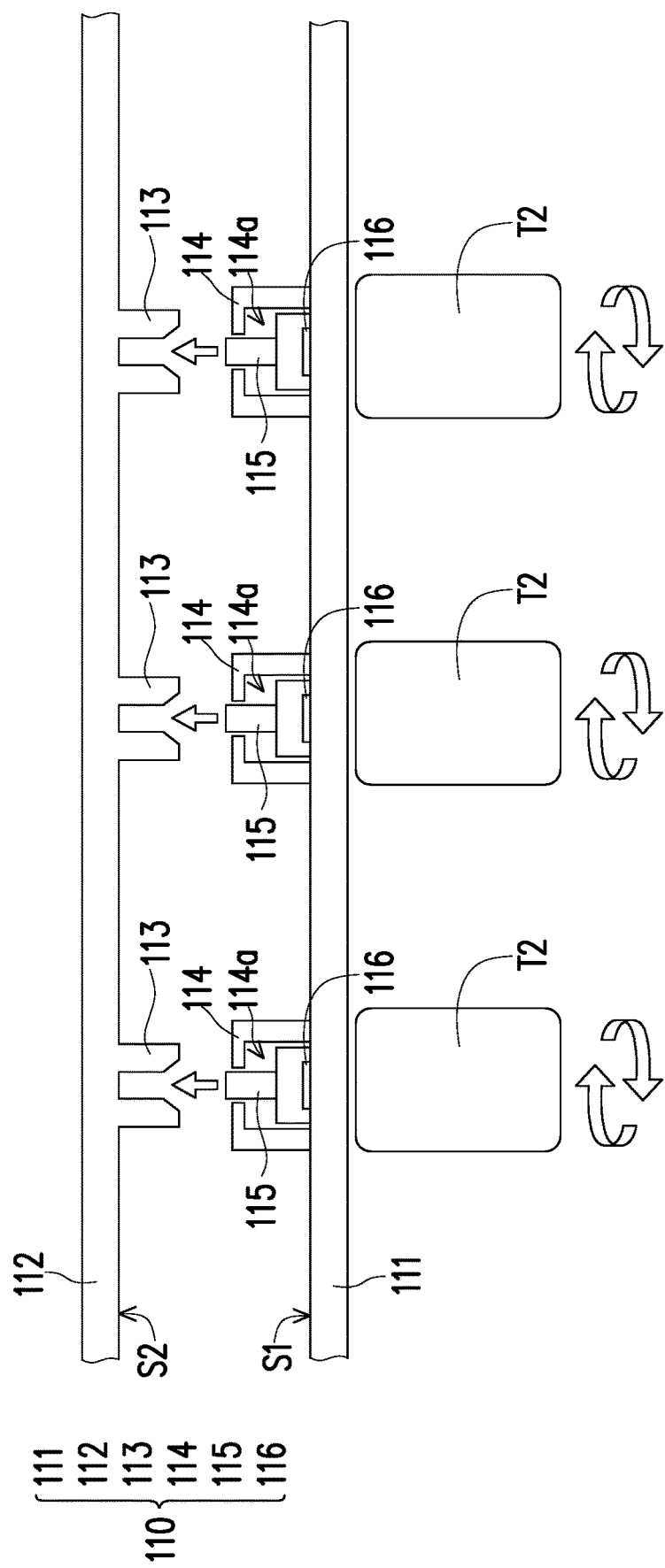
FIG. 2C is a partial cross-sectional view of the foldable electronic device in another mode of operation.

FIG. 2A and FIG. 2B are partial cross-sectional views of the foldable electronic device of FIG. 1. FIG. 2C is a partial cross-sectional view of the foldable electronic device in another mode of operation. Referring to FIG. 1, FIG. 2A and FIG. 2B, in the embodiment, the housing structure of the foldable electronic device 100 further includes a first housing 111 and a second housing 112 of the first body 110, a plurality of holders 114, a plurality screw columns 113, and a plurality screws 115. Each of the holders 114 is disposed on a first surface S1 of the first housing 111 respectively to form a receiving space 114a. The screw columns 113 are disposed on a second surface S2 of the second housing 112 to correspond to an opening 114b of the holders 114 and the receiving spaces 114a respectively. Each of the screws 115 is disposed in the receiving space 114a and protrudes out of the opening 114b of the holders 114 partially to be screwed to the corresponding screw column 113. After the screwing if completed, the first housing 111 and the second housing 112 can be assembled to form an assembling body (equivalent to the first body 110), and the first surface S1 and the second surface S2 are inner surfaces of the assembling body.

In the embodiment, the housing structure (also the first body 110) further includes a plurality of magnets, arranged on the heads of the screws 115 respectively. Therefore, the screws 115 are adapted to be driven by a magnetic tool T1 through the magnets 116 to be locked to or unlocked from the corresponding screw column 113, as shown in FIG. 2A.

Then, referring to FIG. 2C and in contrast to FIG. 2A or FIG. 2B, since the magnets 116 have different magnetic poles, as shown in FIG. 2A, the user places a magnetic tool T1 outside the second housing 112 (facing away from the second surface S2) to magnetically attract the screws 115 provided with the magnets 116. Therefore, the screw 115 is separated from the first surface S1 of the first housing 111 and rotated along with the magnetic tool T1, that is, the screw 115 can be smoothly locked into the screw column 113 with the inner threaded hole. On the contrary, the screw 115 can be unlocked from the screw column 113 so that the screw 115 can fall back to the first surface S1 of the first housing 111.

Relatively, in FIG. 2C, another magnetic tool T2 is used, which is placed outside the first housing 111 (facing away from the first surface S1) and used to generate magnetic repulsion to the magnet 116. Therefore, it is also possible to drive the screw 115 away from the first surface S1, and rotationally drive the screw 115 to lock into or unlock from the screw column 113.

Referring to FIG. 2A, FIG. 2B or FIG. 2C again, the material of the holders 114 in the embodiment is, such as plastic, and is fixed to the first surface S1 of the first housing 111 through a hot-melt process. As the holders 114 for accommodating and positioning the screw 115, in addition to forming the receiving space 114a with the first housing 111, the screw 115 can also be positioned in the receiving space 114a through the opening 114b. The opening 114b communicates with the receiving space 114a and the corresponding screw column 113, and the threaded screw column of each screw 115 passes through the opening 114b and is locked to the corresponding screw column 113. Here, the positioning refers to confining the screws 115 to the first housing 111 to ensure that the screws 115 can be aligned with the screw columns 113 when the first housing 111 and the second housing 112 are assembled by the robot arm. In other words, after the relative positions and corresponding relationships of the holders 114, the screws 115 and the screw columns 113 are established during the design of the housing structure of the embodiment, the automated (no manual required) online assembly operation can be performed by automated equipment (including the aforementioned robotic arm). And as shown in FIG. 1, the simple appearance of the foldable electronic device 100 is maintained.

Figure 3A:
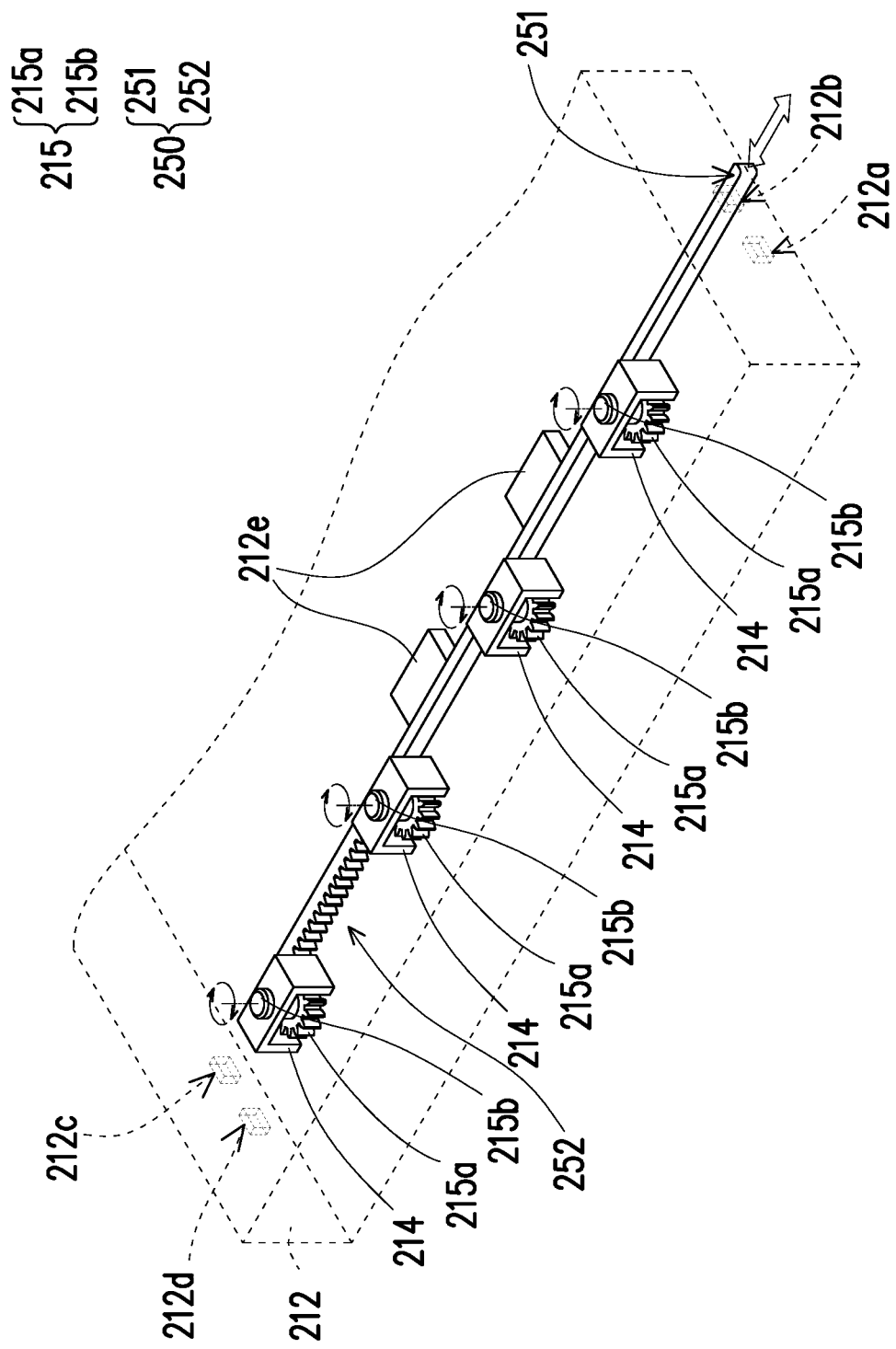
FIG. 3A is a partial schematic diagram of a housing structure according to another embodiment of the present invention.
Figure 3B:
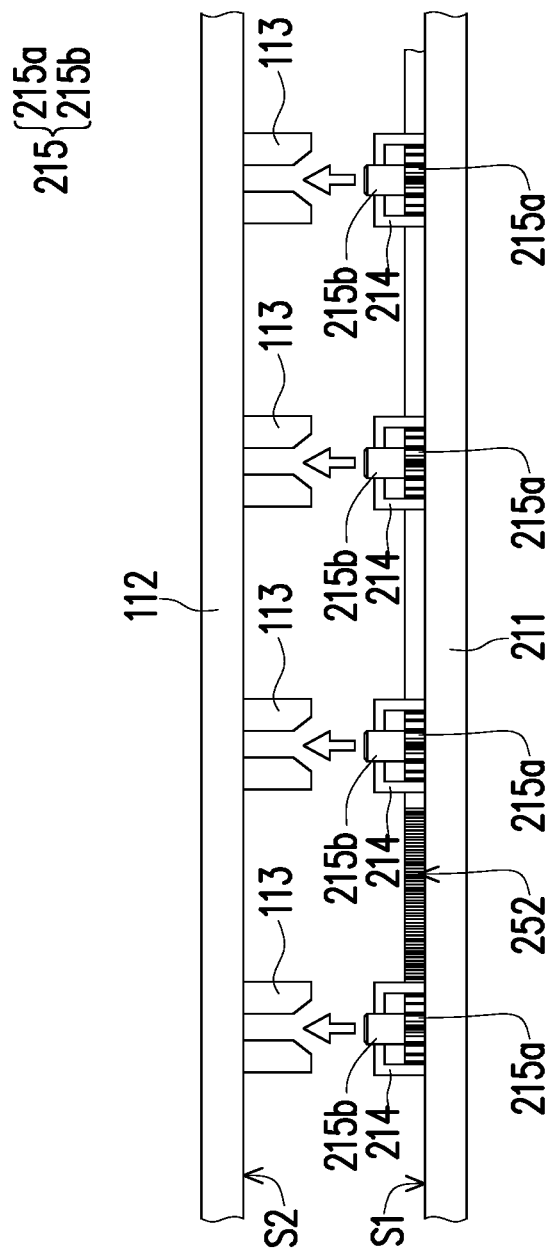
FIG. 3B is a schematic diagram of the locking mechanism of FIG. 3A.

FIG. 3A is a partial schematic diagram of a housing structure according to another embodiment of the present invention. FIG. 3B is a schematic diagram of the locking mechanism of FIG. 3A. Referring to FIG. 3A and FIG. 3B at the same time, different from the previous embodiment, the screw 215 of this embodiment has a gear head 215a and a screw column body 215b, and the housing structure of the portable electronic device further includes a rack 250, which is movably disposed on the first surface S1 of the first housing 212. Wherein the gear head 215a of the screw 215 is located on the moving path of the rack 250, so that the screw 215 is locked to or unlocked from the screw column 113 by being driven by the rack 250.

Further speaking, the rack 250 has a tooth portion 252 and a handle 251, which moves on the first surface S1 of the first housing 212, and can movably make the handle 251 pass through the first housing 212 through the opening 212b. Preferably, a convex rib 212e is provided on the first surface S1 of the first housing 212 for guiding the rack 250. At the same time, the user can hold the portion of the handle 251 that passes through the first housing 212 to drive the rack 250. Like the foregoing embodiment, when the rack 250 moves on the first surface S1, it will pass through the plurality of screws 215 in sequence. Then, the gear head 215a is then driven to lock the screw column body 215b into the corresponding screw column 113 and move away from the first surface S1, or unlocked from the corresponding screw column 113 and fall back to the first surface S1. In other words, the length of the tooth portion 252 of the rack 250 in the embodiment along the moving direction is smaller than the distribution distance of the plurality of screws 215 along the moving direction, so that the tooth portion 252 runs through the screws 215 in sequence. Conversely, if the screw 215 is to be unlocked from the screw column 113, the rack 250 can be driven in the opposite direction. Therefore, the first housing 212 also has an opening 212c on the other side, opposite to the aforementioned opening 212b, so as to facilitate the passage of the rack 250.

It should be mentioned that, as shown in FIG. 3A, the holder 214 in the embodiment is in an inverted U-shape, that is, the gear head 215a of each screw 215 protrudes from the holder 214 to be rotatably coupled to the rack 250.

On the other hand, the first housing 212 of the embodiment also has two other openings 212a, 212d opposite to each other. Therefore, another rack 250 (not shown in the figure) can still be accommodated, and the portion of driving gear head 215a protruding from the holder 214 from the other side can also achieve the rotating motion state of driving screw 215.

To sum up, in the above-mentioned embodiments of the present invention, based on the above, due to the screw columns are arranged on the second surface of the second housing, and the screws and the holders are arranged on the first surface of the first housing. After the first housing and the second housing are assembled by corresponding screws and screw columns to form the assembling body, the first surface and the second surface are the inner surfaces of the assembling body. Accordingly, the above-mentioned locking mechanism substantially forms a hidden locking mechanism of the housing structure of the portable electronic device. In this way, in addition to simplifying the locking mechanism and the locking process, the exterior surface of the housing structure can maintain a simple appearance.

What is claimed is:

1. A housing structure of a portable electronic device, comprising:
    a first housing;
    a plurality of holders, disposed on a first surface of the first housing respectively to form a receiving space;
    a second housing;
    a plurality screw columns, disposed on a second surface of the second housing to correspond to the receiving spaces respectively; and
    a plurality screws, disposed in the receiving space protrudes out of the receiving member partially to be screwed to the corresponding screw column so as to assemble the first housing and the second housing together to form an assembling body, and the first and the second surfaces are inner surfaces of the assembling body, wherein each of the screws has a gear head, and the housing structure of the portable electronic device further comprises a rack, movably disposed on the first housing, and the gear heads of the screws are located on the moving path of the rack, so that the screws driven by the rack are locked to or unlocked from the screw columns.

2. The housing structure of the portable electronic device according to claim 1, wherein the material of each of the holders is plastic, and is fixed to the first housing through a hot-melt process.

3. The housing structure of the portable electronic device according to claim 1, wherein each of the holders has an opening that communicates with the receiving space and the corresponding screw columns, and the threaded screw columns of each screw passes through the opening and is locked to the corresponding screw columns.

4. The housing structure of the portable electronic device according to claim 1, wherein the rack has a handle that movably passes through the first housing.

5. The housing structure of the portable electronic device according to claim 1, wherein the rack moves on the first surface, and each of the screws is locked to the corresponding screw columns and moves away from the first surface, or unlocked from the corresponding screw columns and falls back to the first surface.

6. The housing structure of the portable electronic device according to claim 1, wherein the length of the rack is less than the distribution distance of the screws.

7. The housing structure of the portable electronic device according to claim 1, wherein the gear head of each screws protrudes from the holders for rotatably coupling to the rack.

* * * * *